United States Patent [19]

Matsuda

[11] Patent Number: 4,674,913
[45] Date of Patent: Jun. 23, 1987

[54] APPARATUS FOR CONSTRUCTION OF CONTINUOUS ARTICLE HAVING BORES

[76] Inventor: Shinichi Matsuda, 32-14, Higiriyama 1-chome,, Konan-ku, Yokohama, Kanagawa 233, Japan

[21] Appl. No.: 681,888
[22] PCT Filed: Jan. 13, 1984
[86] PCT No.: PCT/JP84/00005
   § 371 Date: Nov. 19, 1984
   § 102(e) Date: Nov. 19, 1984
[87] PCT Pub. No.: WO84/03726
   PCT Pub. Date: Sep. 27, 1984

[30] Foreign Application Priority Data

| Mar. 22, 1983 | [JP] | Japan | 58-45879 |
| May 2, 1983 | [JP] | Japan | 58-76191 |
| May 26, 1983 | [JP] | Japan | 58-91464 |
| Aug. 15, 1983 | [JP] | Japan | 58-148000 |
| Nov. 25, 1983 | [JP] | Japan | 58-220756 |
| Dec. 27, 1984 | [JP] | Japan | 59-244887 |

[51] Int. Cl.⁴ .................................... E21D 9/06
[52] U.S. Cl. .................................... 405/146; 405/141
[58] Field of Search ............... 405/141, 143, 146, 150, 405/155; 264/33; 425/59, 63, 64

[56] References Cited

U.S. PATENT DOCUMENTS

| 3,350,889 | 11/1967 | Sturm | 405/146 X |
| 3,379,024 | 4/1968 | Wohlmeyer | 405/146 |
| 3,561,223 | 2/1971 | Tabor | 405/146 X |
| 3,785,759 | 1/1974 | Johnson et al. | 425/59 |
| 3,877,860 | 4/1975 | Putti | 425/64 X |
| 4,001,358 | 1/1977 | McNeill et al. | 264/33 |
| 4,400,108 | 8/1983 | Freeman | 405/155 |

FOREIGN PATENT DOCUMENTS

| 2703536 | 8/1978 | Fed. Rep. of Germany | 405/146 |
| 51-96139 | 8/1976 | Japan . | |
| 51-117424 | 10/1976 | Japan . | |

OTHER PUBLICATIONS

Yano Shintaro "Shield Koho" Showa 53 nen (1978), Hakko, Kashima Shuppan-kai (Tokyo) P315115-P31613.

Primary Examiner—David H. Corbin
Attorney, Agent, or Firm—Oblon, Fisher, Spivak, McClelland & Maier

[57] ABSTRACT

This invention provides an apparatus for construction of an underground or aboveground continuous article (98) which has at least one bore (99). In case the article is made underground, the apparatus has at least one rotary cutter (51) for excavating the earth and a spoil discharge device which separates water from the spoil (97) and discharges separately the water and the dewatered spoil, respectively. The apparatus has at least one electric heater (49) for heating material (95) passing a space (67) disposed between a tubular member (45) and a bore forming member (46).

2 Claims, 10 Drawing Figures

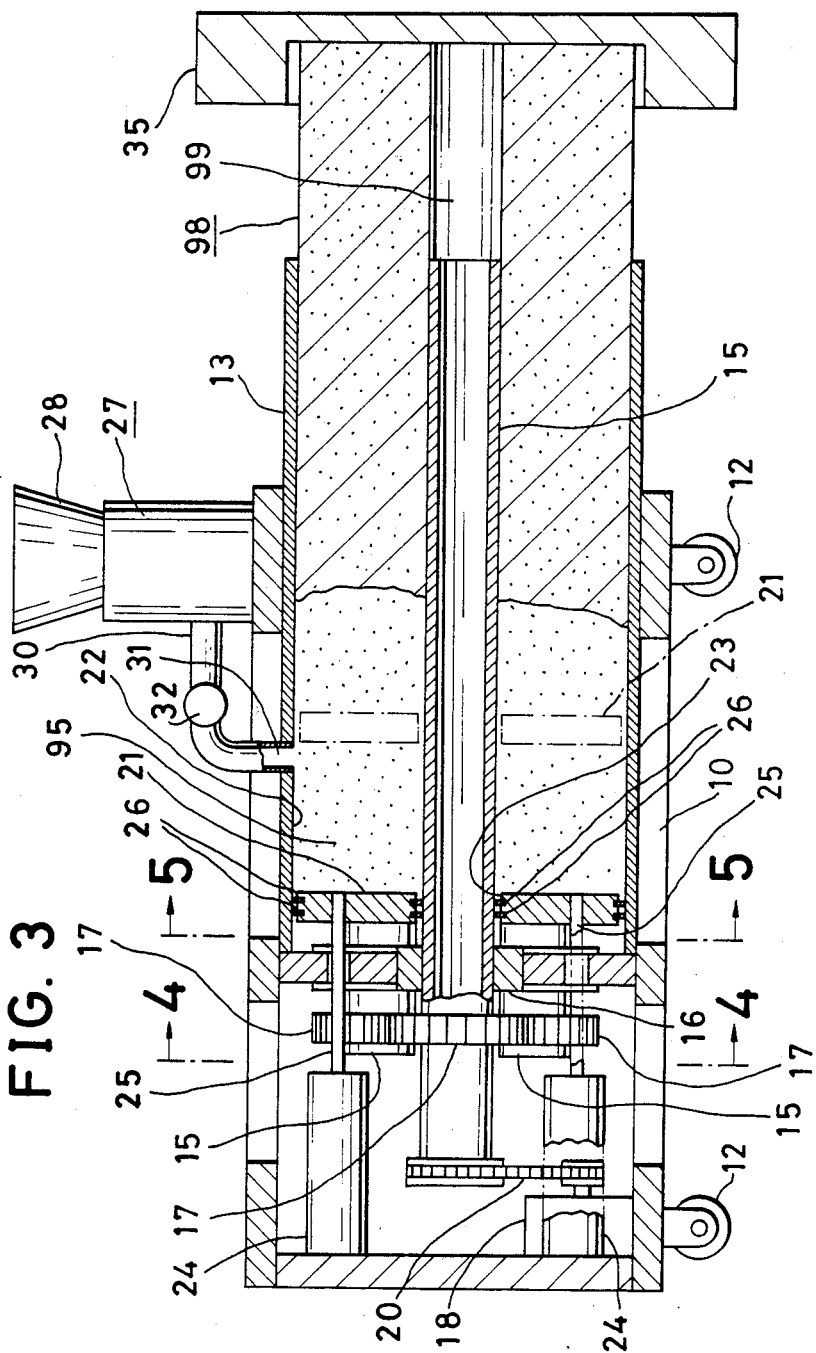

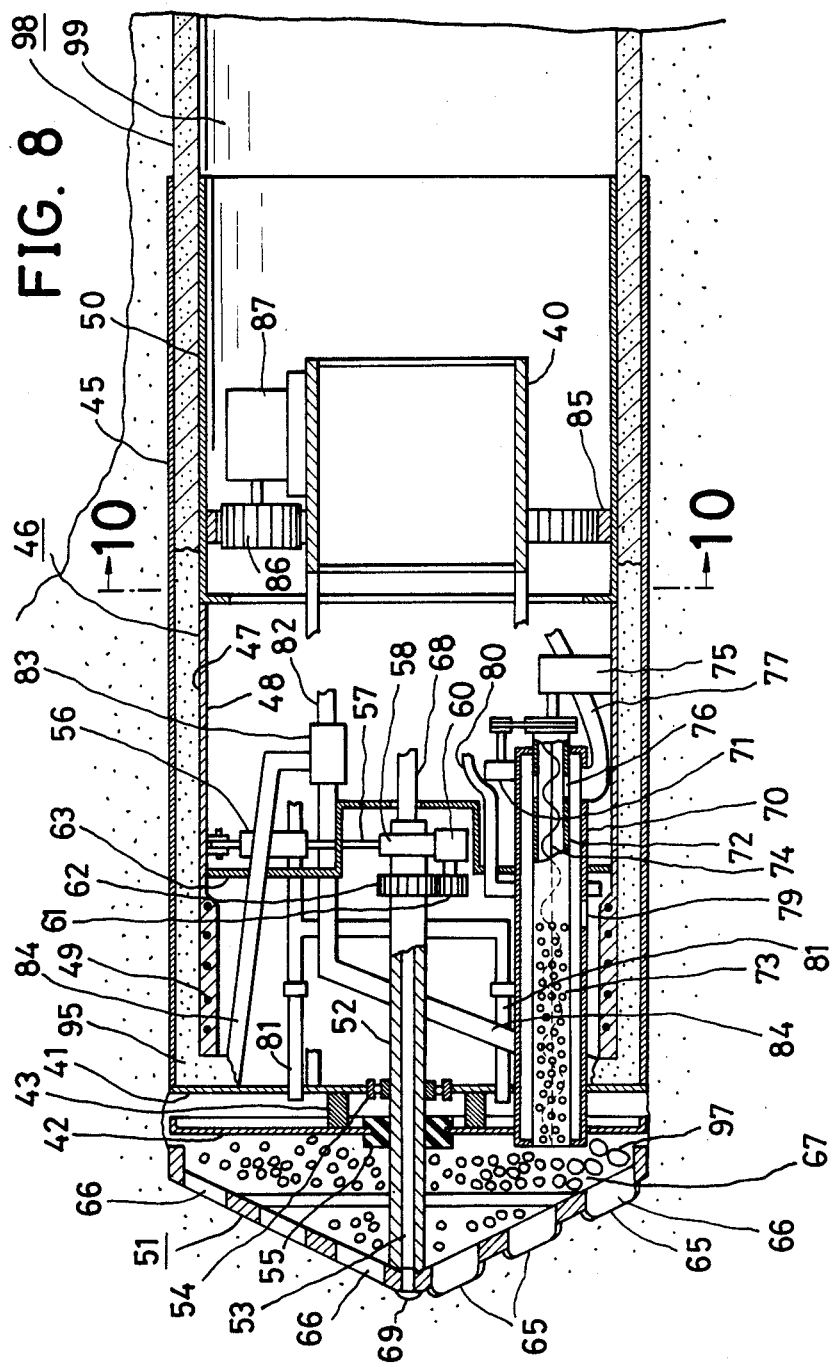

APPARATUS FOR CONSTRUCTION OF CONTINUOUS ARTICLE HAVING BORES

DESCRIPTION

TECHNICAL FIELD

This invention relates to an apparatus for construction of a continuous article which has at least one bore and is elongated to a large length with a uniform cross-sectional configuration. The apparatus may have at least one rotary cutter for excavating the earth and may form the continuous article underground. The apparatus may not have a rotary cutter and may form the continuous article aboveground.

BACKGROUND ART

Hitherto, various such apparatuses have been suggested. For example, machines for forming a continuous seamless concrete background pipe are known from U.S. Pat. Nos. 3,785,759 and 3,877,860. Tunneling machines which both excavate and form a concrete tunnel wall are also known from U.S. Pat. Nos. 3,350,889 and 3,561,223, for example. Sometimes, the tunneling machine of the prior art discharges spoil including a vast quantity of water, therefore it is very difficult to find the place for easily discharging the spoil mixed with the water. If the water can be separated from the spoil, it is very easy to discharge the water anywhere without problems. The aboveground concrete pipe and the tunnel wall constructed using the machines of prior art are made of concrete, therefore the strengths thereof are low.

DISCLOSURE OF THE INVENTION

One object of the present invention is to provide an apparatus for excavating the earth and constructing an underground continuous article having at least one bore which enables separation of water from the spoil and separate discharge of the water and the other spoil, respectively.

Another object of the present invention is to provide an apparatus which is able to construct a strong continuous article.

The present invention provides an apparatus for underground construction of a continuous article having at least one bore which has at least one rotary cutter and a spoil discharge device. The spoil discharge device includes a suction pipe disposed so as to open to a space for containing the spoil at the front end thereof and rotatably supported around the axis thereof and having a perforate portion at the front part thereof, driving means for rapidly rotating the suction pipe, a screw conveyor disposed in the suction pipe, driving means for slowly rotating the screw conveyor, means for discharging the water ejected from the perforate portion, and means for discharging the spoil sent by the screw conveyor.

The present invention also provides an apparatus for construction of a continuous article having at least one bore which has at least one electric heater for heating material passing a space and becoming the continuous article.

Various other objects, features, and attendant advantages of the present invention will be more fully appreciated as the same becomes better understood from the following detailed description when considered in connection with the accompanying drawings.

BRIEF DESCRIPTION OF DRAWINGS

FIG. 3 is a sectional view taken along the line 3—3 of FIG. 2;

FIG. 8 is a sectional view taken along the line 8—8 of FIG. 7 showing a condition of use;

BEST MODE OF CARRYING OUT THE INVENTION

Figure 1:
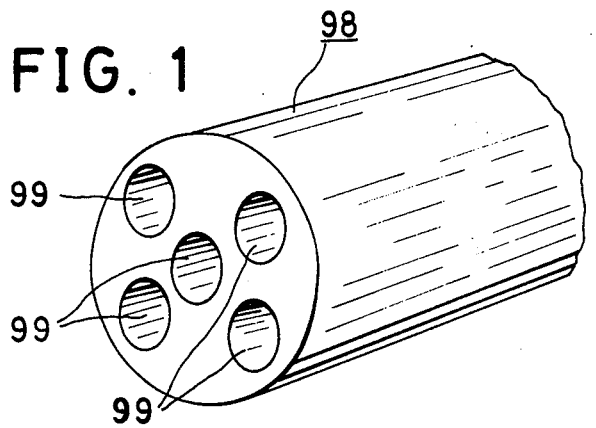
FIG. 1 is a perspective view partially showing a continuous article having bores constructed by one embodiment of the present invention.
Figure 2:
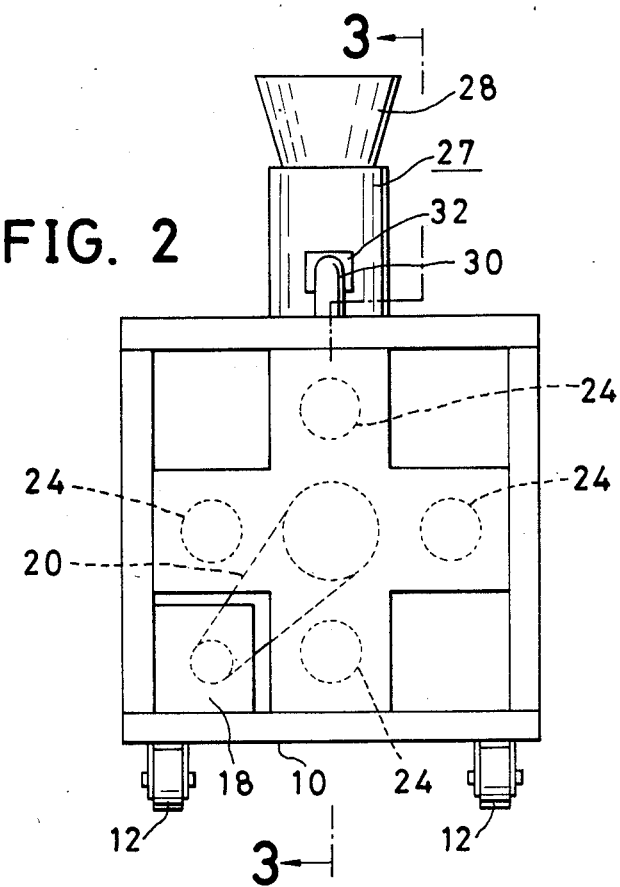
FIG. 2 is a front view of the embodiment.
Figure 5:
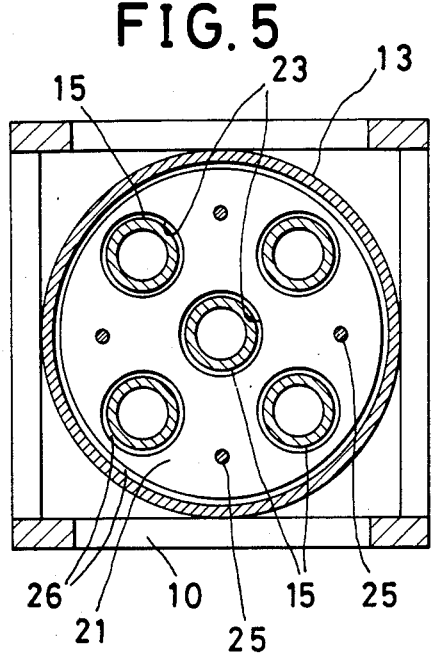
FIG. 5 is a sectional view taken along the line 5—5 of FIG. 3.
Figure 4:
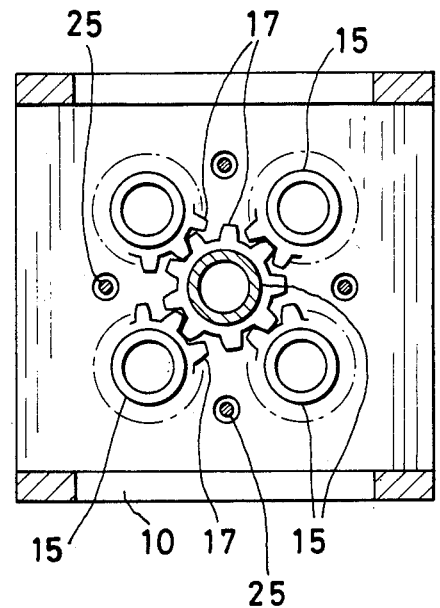
FIG. 4 is a sectional view taken along the line 4—4 of FIG. 3.

Referring now to FIG. 1, there is shown a continuous article 98 which has a plurality of bores 99 constructed by an embodiment of the present invention. In FIGS. 2-5, an of the apparatus embodiment for construction of the continuous article is shown. The apparatus has a frame 10 which has a plurality of wheels 12. A tubular member 13 is fixed to the frame and has a cross-sectional configuration for surrounding the outer surface of the continuous article 98 and is elongated to a prescribed length. A plurality of bore forming members 15 are disposed in a space surrounded by the tubular member, each of which has a cross-sectional configuration so as to be fitted into a bore 99 and contacts the inner surface of the each bore and is elongated to a prescribed length. The bore forming member may not be hollow and may instead be solid. Each bore forming member 15 is rotatably supported by a bearing 16. A gear 17 is fixed to the each bore forming member 15 and meshes with gears for the other ones as shown. A motor 18 having a reduction gears rotates the central bore forming member 15 at a low center with small rotating speed by means of a chain 20, therefore all of the other bore forming members 15 are driven with the same rotating speed as that of the central bore forming member 15.

A pushing member 21 movably covers the front end of the space 22 formed between the tubular member 13 and the bore forming members 15 and is able to be inclined by a prescribed angular range and has holes 23, each of which is penetrated by a bore forming member 15. Four oil pressure cylinders 24 are fixed to the frame 10, and pistons 25 are movably elongated from the cylinders and ends thereof are fixed to the pushing member 21. Therefore, the pushing member 21 is able to be moved forward and backward and be inclined. Packings 26 are provided at outer surface of the pushing member 21 and at inner surface of the each hole 23. A material supplying device 27 is installed on the frame 10. Material 95 which is able to be fed by pressure feeding and quickly hardens, such as resin mortar or high early strong concrete, for example, is thrown into a hopper 28 of the material supplying device and is fed after mixing thereof. The material 95 is intermittently fed to an inlet port 31 opened to the space 22 through a pipe 30. A valve 32 is provided and is opened while the material 95 being fed and is closed after feeding has ceased. An end plate 35 is initially disposed by not shown means at a prescribed position and covers the back end of the space 22 and is to be left behind at its initial position when the frame 10 is moved forward.

In use of the above described apparatus, the material 95 is fed by opening of the valve 32 while each bore forming member 15 is driven and the pushing member 21 is initially at the foremost leftward position, as seen in FIG. 3. The feeding of the material 95 is continued until the space 22 is substantially filled therewith. Then, the valve 32 is closed and after a pescribed time duration the pushing member 21 is relatively moved backward against the frame, therefore the frame 10 is moved forward. In this case, the material 95 in the space 22 sets the hardens and is exposed as the continuous article 98. The pushing member 21 is returned after it has reached to a prescribed position, (shown in chain lines) and after it has passed the position of the inlet port 31 the material 95 is again fed. The feeding of the material is continued until pushing member 21 has again reached to the foremost position and the space is filled with the material. Then, the valve 32 is closed and the pushing member 21 is moved backward and the same actions are repeated. The material 95 gradually sets and hardens in the space 22 following its backward movement. The material 95 contracts following its setting and hardening, but it does not adhere to the bore forming members 15, because the bore forming members are rotated, and smooth surfaces of the bores 99 are obtained. As the frame 10 is moved forward when the pushing member 21 is moved backward, the material 95 can not be pressed in some cases. In such cases, not shown braking means for the wheels 12 may be used, or another working vehicle may be used for preventing the movement of the frame 10. In case the continuous article 98 is to be bent, it is necessary to reduce the stroke of the piston 25 disposed at the bent side so as to reduce the movement of the same side of the pushing member 21 relative to that of opposite side, so that the bent continuous article 98 is obtained. In such case, the pushing member 21 is somewhat inclined.

Figure 6:
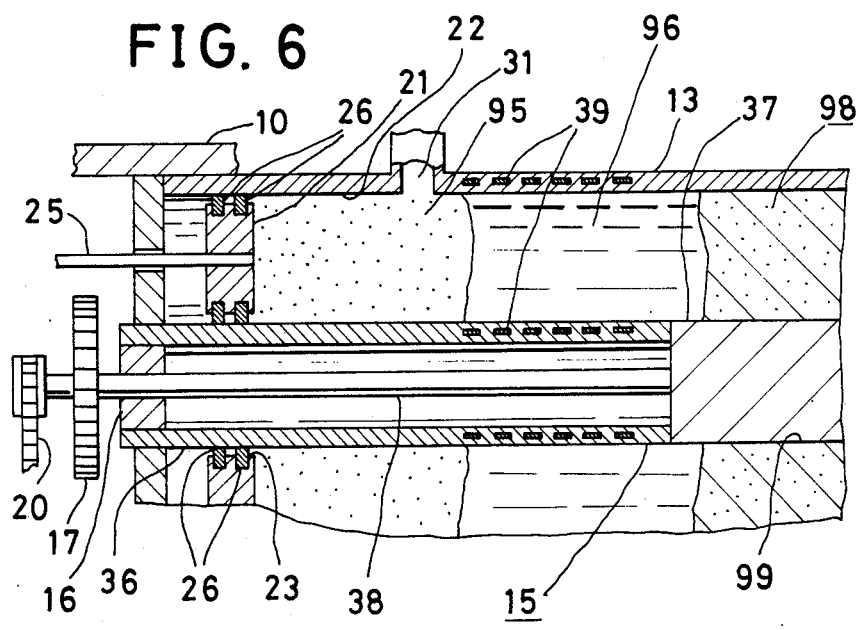
FIG. 6 is a sectional view partially showing another embodiment of the present invention which is a variant of the embodiment shown in FIGS. 2-5.
Figure 7:
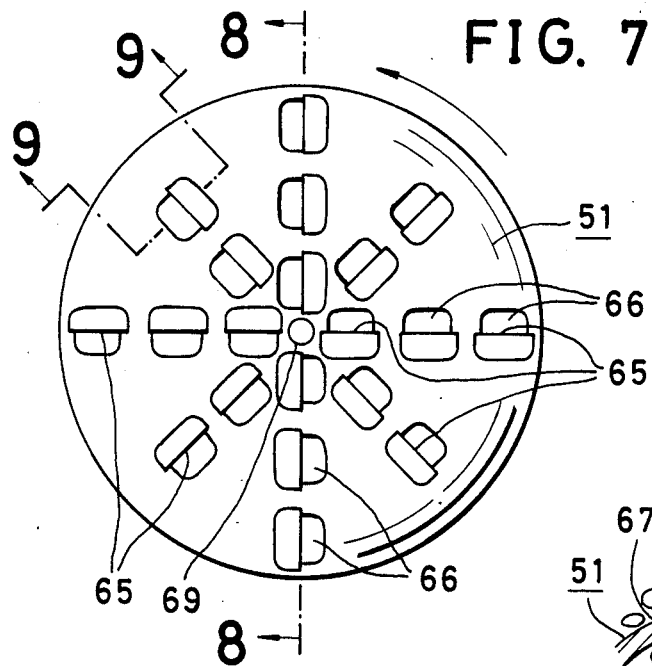
FIG. 7 is a front view of another embodiment of the present invention.
Figure 9:
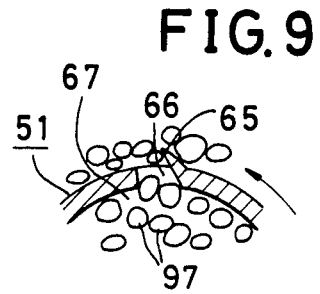
FIG. 9 is a sectional view taken along the line 9—9 of FIG. 7.
Figure 10:
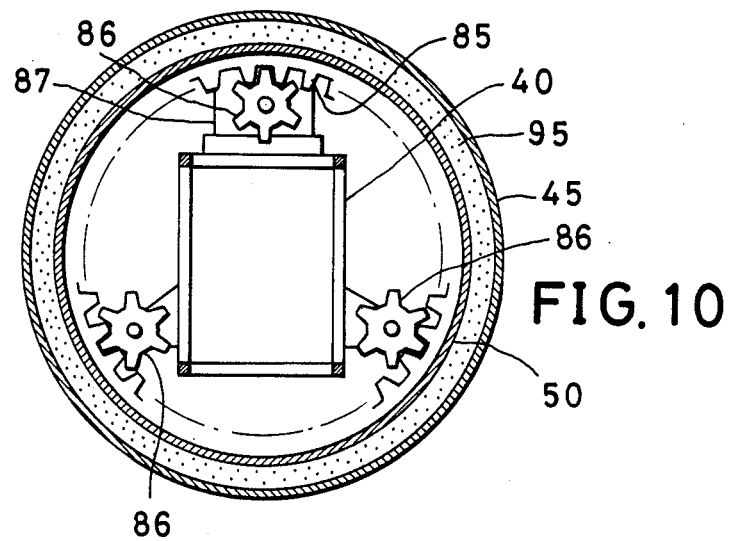
FIG. 10 is a sectional view taken along the line 10—10 of FIG. 8.

Another embodiment of the present invention is shown in FIG. 6, which is a variation of the embodiment shown in FIGS. 2-5. In this embodiment, a front portion 36 of the each bore forming member 15 is fixed to the frame 10, and only the back portion 37 disposed where the material solidifys is rotated by means of a shaft 38. Heaters 39 are embedded in the tubular member 13 and the front portion 36 of the each bore forming member 15. In this case, the heaters are energized, and a resinous mortar mixed with power of a synthetic resin of polyethylene series, and silica sand or slag is fed as the material 95. The powder of the synthetic resin in the material 95 is heated and melted as a liquid 96 at first and thereafter solidifys at back position.

In the embodiments described above, the pushing member 21 may be inclinable only in right and left direction. The tubular member 13 may have various cross-sectional configration other than circle, such as square or the like. If the apparatus has at least one of the bore forming member 13, the number of that may be changed. Further, various means, such as air cylinder or the like, may be used as the actuating means of the pushing member 21. The material supplying device 27 may be installed on another working vehicle for feeding the material 95 to the inlet port 31 by means of a hose.

In FIGS. 7-10, an apparatus of another embodiment of the present invention is shown. The apparatus bores the earth and constructs a continuous article having a bore or a tubular wall at the same time. The apparatus has a frame 40 inside thereof, a circular end plate 41 is fixed to the front portion of the frame (detail is not shown). A circular front plate 42 is provided at front position apart from the end plate 41 by means of an annular member 43. A tubular member 45 is fixed to the periphery of the end plate 41 and is elongated backward. A tubular bore forming member 46 is provided inside the tubular member 45 so as to form an annular space 47 between thereof and is composed of a fixed portion 48 which is fixed to the end plate 41 at the front end thereof by not shown means and a rotary portion 50 which is disposed at back position of the fixed portion. An electric heater 49 is embedded in a part of the fixed portion 48. The rotary portion is rotatably supported by not shown means eliminating any separation from the fixed portion 48.

A rotary cutter 51 is provided and has a hollow shaft 52 through which a fluid passage 53 is formed. The shaft 52 is rotatably supported on the end plate 41 by means of a bearing 54. A packing 55 made of rubber is provided for sealing the position where the shaft 52 penetrates the front plate 42. An oil pressure cylinder 56 is installed to the fixed portion 48 of the bore forming member 46 and has a piston 57 which is connected to a bearing member 58 for supporting the back portion of the shaft 52 and is adapted to change the inclination angle of the shaft 52 by moving relation to the cylinder. Usually, another not shown oil pressure cylinder 56 is installed in a cross direction to the above described oil pressure cylinder for changing the inclination of the shaft 52 in at transverse directions thereof. But, only one horizontally disposed oil pressure cylinder may be installed for adjusting right and left directional incline of the shaft 52. A driving device 60 which is an electric or oil pressure motor, for example, is installed to the bearing member 58 and rotates the rotary cutter 51 by means of gears 61, 62. A partition plate 63 is fixed to the fixed portion 48 of the bore forming member 46 at periphery thereof and partitions the inner space as two portions. The rotary cutter 51 has many cutting portions 65 at the front surface thereof for excavating the earth. The spoil 97 produced by excavating the earth such as mud and sand or the like is passed through passages 66 and stored in a space 67 disposed at rear position of the rotary cutter 51. A pipe 68 is connected to the fluid passage 53 of the shaft 52 and is adapted to be connected to a not shown hose for feeding high pressure water. When the rotary cutter 51 excavates a rock or a clayey portion, the high pressure water is injected from the front end of the rotary cutter for avoiding damage of the cutting portions 65 and adhesion of the spoil to the cutting portions 65. A check valve 69 is provided and is opened when the high pressure water is injected through the fluid passage 53 and is automatically closed when the injection of the high pressure water has ceased.

A tubular member 70 is disposed at a lower position in the bore forming member 46 and penetrates the front plate 42, the end plate 41, and the partition plate 63 and is fixed thereto. A driving device 71 such as an oil pressure motor or an electric motor or the like is provided. A suction tube 72 is rotatably supported in the tubular member 70 and is rotated with considerably high speed by the driving device 71 and has a perforate portion 73 at a front part thereof. A screw conveyor 74 is provided in the suction tube 72 and is slowly rotated with a little vibrated movement by a driving device 75, such as an electric motor or the like, so as to avoid the adhesion of the spoil 97 thereto. Therefore, the spoil 97 in the space 67 is fed backwardly by the screw conveyor 74 and water is ejected into the tubular member 70 from the perforate portion 73 by the rotation of the suction pipe 72. Openings 76 are provided at rear portion of the suction tube 72. The spoil 97 fed by the screw conveyor 74 falls through the openings into the tubular member 70. A pipe 77 is provided for passing the spoil 97 from the tubular member 70 to a not shown vacuum hose which sucks the spoil by vacuum. The tubular member 70 has an opening 79 at the lower portion of the perforate portion 73 for passing the water ejection from the perforated portion 73. The water passed through the opening is fed through a pipe 80 and is discharged to the exterior of the device by a not shown pump. Pipes 81 are used for feeding compressed air into the space disposed between the end plate 41 and the front plate 42 at outside of the annular member 43 from a not shown compressed air source, thus the collapse of the surrounding surface formed by excavation and the outflow of the water are avoided.

A host 82 is used for feeding material 95 from a not shown material supplying device. A press feeding pump 83 is used for pressing and feeding the material fed from the hose. The material 95 fed from the pump is supplyed by a pair of pipes 84 into the space 47. Only one pipe 84 may be installed instead of the two pipes 84. It is necessary to use as the material 95 a material which is able to be fed by pressure and hardens quickly, such as resin mortar or high early strong concrete, for example. In case of heat curable resin mortar mixed with powder of a synthetic resin of polyethylene series and silica or slag is fed as the material 95, the heater 49 is energized by supplying an electric current. Thus, the powder of the synthetic resin in the material is heated and first melted, and thereafter solidifies. Therefore, the strong continuous article 98 can be obtained. An inner gear 85 is fixed to the inner surface of the rotary portion 50. Three gears 86 for meshing with the inner gear 85 are rotatably supported against the frame 40, one of which is driven by a driving device 87, such as an electric motor or the like. Therefore, the rotary portion 50 is slowly rotated.

The apparatus of the embodiment shown in FIGS. 7–10 excavates a tunnel by cutting mud and sand and constructs a continuous article 98 having a bore 99 inside the tunnel. The pressure of the material 95 fed with pressure in the space 47 is able to move the rotary cutter 51 fowardly. If it is necessary to bend the continuous article 98, it can be done by changing the direction of the rotary cutter 51 using oil pressure cylinders 56. If necessary, a reinforced concrete wall may be constructed so as to contact to the inner surface of the continuous article 98 already constructed.

The apparatus may not have the rotary cutter and the spoil discharge device for making a continuous article having a bore or bores on the earth. In such case, the apparatus has a tubular member and a bore forming member or a plurality of bore forming members disposed inside the tubular member and is able to support an electric heater or electric heaters for heating material passing through a space between the tubular member and the bore forming member or bore forming members as the above described embodiment. The heater or heaters may be embedded in the tubular member and/or the bore forming member or bore forming members.

It is easily understood that various changes of the present invention is possible in the scope of the claims.

I claim:

1. In an apparatus having at least one rotary cutter for construction of a continuous underground article having at least one bore, a spoil discharge device comprising:
    a rotatable suction pipe having a front end opening to a space containing said spoil, and having a perforate portion;
    driving means for rapidly rotating said suction pipe about a longitudinal axis thereof;
    a screw conveyor disposed in said suction pipe;
    driving means for slowly rotating said screw conveyor;
    means for discharging water ejected from said perforate portion; and
    means for separately discharging dewatered spoil conveyed by said screw conveyor.

2. An apparatus of claim 1, including means for forming said continuous article from heat curable material, and at least one electric heater for heating said material passing thereby.

* * * * *